United States Patent
Smith et al.

(10) Patent No.: US 11,506,171 B2
(45) Date of Patent: Nov. 22, 2022

(54) WIND TURBINE BLADE SPAR STRUCTURE AND METHOD OF MANUFACTURING

(71) Applicant: Vestas Wind Systems A/S, Aarhus N. (DK)

(72) Inventors: Jonathan Smith, Burridge (GB); John Rimmer, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/973,551

(22) PCT Filed: Jun. 10, 2019

(86) PCT No.: PCT/EP2019/065074
§ 371 (c)(1),
(2) Date: Dec. 9, 2020

(87) PCT Pub. No.: WO2019/238606
PCT Pub. Date: Dec. 19, 2019

(65) Prior Publication Data
US 2021/0246868 A1    Aug. 12, 2021

(30) Foreign Application Priority Data
Jun. 11, 2018    (DK) ............................ PA 2018 70342

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F03D 1/0641* (2013.01);
(Continued)

(58) Field of Classification Search
CPC ..... F03D 1/0675; F03D 1/0683; F03D 1/0641
See application file for complete search history.

(56) References Cited

U.S. PATENT DOCUMENTS

| 8,529,717 B2 * | 9/2013 | Hedges | B29C 70/083 |
| | | | 156/83 |
| 8,789,275 B2 * | 7/2014 | Esaki | B29C 70/443 |
| | | | 29/889.71 |

(Continued)

FOREIGN PATENT DOCUMENTS

| CN | 102562435 A | 7/2012 |
| CN | 106378942 A | 2/2017 |

(Continued)

OTHER PUBLICATIONS

European Patent Office, International Search Report and Written Opinion in PCT Application No. PCT/EP2019/065074, dated Sep. 25, 2019.

(Continued)

*Primary Examiner* — Woody A Lee, Jr.
*Assistant Examiner* — Wesley Le Fisher
(74) *Attorney, Agent, or Firm* — Wood Herron & Evans LLP

(57) ABSTRACT

A wind turbine blade mould extending longitudinally in a spanwise direction and transversely in a chordwise direction is provided and a spar cap (134, 136) is laid the mould. The spar cap comprises a plurality of strips (138) extending longitudinally in the spanwise direction and arranged side-by-side in the chordwise direction, said strips comprising one or more intermediate strips (158) arranged between peripheral strips (160, 162) which are inclined relative to the intermediate strips. A shear web (126) comprising a flange (130a) extending longitudinally in the spanwise direction is provided, the flange comprising a base (144) defining a primary bonding surface (164). A chordwise width of the primary bonding surface corresponds substantially to a chordwise width of the intermediate strips of the spar cap.

(Continued)

The primary bonding surface of the flange is bonded to the one or more intermediate strips of the spar cap.

16 Claims, 7 Drawing Sheets

(52) U.S. Cl.
CPC ...... *F03D 1/0683* (2013.01); *F05B 2240/301* (2013.01); *F05B 2250/712* (2013.01)

(56) References Cited

U.S. PATENT DOCUMENTS

| | | | |
|---|---|---|---|
| 10,077,758 B2* | 9/2018 | Yarbrough | F03D 1/0675 |
| 10,113,532 B2* | 10/2018 | Riahi | F03D 1/0675 |
| 10,137,542 B2* | 11/2018 | Upton | F03D 80/00 |
| 10,422,316 B2* | 9/2019 | Yarbrough | B29C 70/443 |
| 10,487,797 B2* | 11/2019 | Hancock | B29D 99/0025 |
| 10,619,622 B2* | 4/2020 | Livingston | B29C 70/48 |
| 10,987,879 B2* | 4/2021 | Johnson | B29C 70/342 |
| 11,041,477 B2* | 6/2021 | Wardropper | B29D 99/0028 |
| 2014/0301859 A1* | 10/2014 | Hancock | B29C 70/865 416/230 |
| 2017/0030330 A1 | 2/2017 | Caruso et al. | |
| 2017/0058867 A1 | 3/2017 | Yarbrough et al. | |
| 2017/0114773 A1 | 4/2017 | Riahi et al. | |
| 2019/0195191 A1* | 6/2019 | Girolamo | F03D 1/0675 |

FOREIGN PATENT DOCUMENTS

| | | | |
|---|---|---|---|
| CN | 106903917 A | 6/2017 | |
| WO | 2014079456 A1 | 5/2014 | |
| WO | 2015096840 A1 | 7/2015 | |
| WO | 2016177375 A1 | 11/2016 | |
| WO | WO-2016177375 A1 * | 11/2016 | F03D 1/0675 |
| WO | 2017016566 A1 | 2/2017 | |
| WO | 2018091054 A1 | 5/2018 | |

OTHER PUBLICATIONS

Danish Patent and Trademark Office, Search and Examination Report in PA 2018 70342, dated Dec. 18, 2018.
China National Intellectual Property Administration, First Notification of Office Action in CN Application No. 201980050009.4, dated Mar. 2, 2022.
Intellectual Property India, Examination Report in IN Application No. 202017057261, dated Jun. 29, 2022.

* cited by examiner

WIND TURBINE BLADE SPAR STRUCTURE AND METHOD OF MANUFACTURING

TECHNICAL FIELD

The present invention relates generally to wind turbine blades, and more specifically to a wind turbine blade having an improved spar structure and to a method of fabricating the improved spar structure.

BACKGROUND

Modern wind turbine blades comprise a shell defining the aerodynamic contour of the blade and one or more longitudinally-extending spars that act as the main load-bearing structures of the blade. A spar typically comprises a shear web connected between opposed spar caps. The spar caps are provided respectively on windward and leeward sides of the blade and are generally bonded to or are integral with the blade shell. The shear web is typically a longitudinally-extending structure comprising a web panel arranged between windward and leeward flanges. These flanges are bonded respectively to the opposed spar caps during manufacture of the blade.

An example of a known shear web flange is described in applicant's PCT application WO2016/177375A1. The flange is T-shaped in cross-section and comprises an upstand extending transversely to the base. The upstand is integrated with the shear web panel, whilst the base defines a bonding surface for bonding to a spar cap.

It is known to form the spar caps from several strips of reinforcing material, for example carbon-fibre reinforced plastic (CFRP). The strips are generally formed by pultrusion. A typical spar cap comprises a plurality of strips stacked one on top of another. In some blades, the strips may be arranged, e.g. stacked, side-by-side to form a spar cap. In particular it is known to form a spar cap using two side-by-side stacks of pultruded strips. This allows relatively wide spar caps to be formed using narrower strips, which are cheaper to produce than wider strips and allow the spar cap to conform better to the chordwise curvature of the blade shell.

However, as the strips are typically flat, planar structures, they do not conform exactly to the chordwise curvature of the blade mould, and instead form a V-shape when arranged in the blade mould during manufacture of the blade. A gap is therefore defined between the strips and an outer skin of the blade shell, which is greatest at the centre of the strips. This effect is known as 'planking'. The gap is filled with resin during manufacture of the blade, but results in a resin rich area between the spar caps and the skin. Further planking occurs between the base of the shear web flange and the spar caps with a relatively large gap occurring between the centre of the base and the spar caps. This results in the adhesive bond line thickness between the shear web and spar cap being uneven across the width of the flange, with excess adhesive being required to fill the large gap between the base and the spar cap.

The present invention aims to provide an improved spar structure and associated method of making a spar structure in which planking is reduced and more even bond lines may be achieved.

SUMMARY OF THE INVENTION

In a first aspect of the present invention there is provided a method of fabricating a wind turbine blade spar structure having a shear web bonded between opposed spar caps. The method comprises providing a wind turbine blade mould extending longitudinally in a spanwise direction and transversely in a chordwise direction, laying a spar cap in the mould, the spar cap comprising a plurality of strips extending longitudinally in the spanwise direction, the strips being arranged side-by-side in the chordwise direction and comprising one or more intermediate strips arranged between respective peripheral strips, and the peripheral strips being inclined relative to the one or more intermediate strips. The method further comprises providing a shear web comprising a flange extending longitudinally in the spanwise direction, the flange comprising a base defining a primary bonding surface, selecting a chordwise width of the primary bonding surface to correspond substantially to a chordwise width or a combined chordwise width of the one or more intermediate strips of the spar cap, and bonding the primary bonding surface of the flange to the one or more intermediate strips of the spar cap.

The chordwise width of the primary bonding surface corresponds substantially to a chordwise width or a combined chordwise width of the one or more intermediate strips of the spar cap. By "correspond substantially" means that the chordwise width of the primary bonding surface does not have to exactly match the chordwise width or a combined chordwise width of the one or more intermediate strips of the spar cap. In particular, there may be a tolerance of +/−20%, or more preferred is +/−10%, or even +/−5%. The chordwise width of the primary bonding surface may exactly match the chordwise width or a combined chordwise width of the one or more intermediate strips of the spar cap.

The primary bonding surface may be substantially parallel to the one or more intermediate strips of the spar cap.

The base of the flange may further define at least one secondary bonding surface extending alongside the primary bonding surface in the spanwise direction, the at least one secondary bonding surface being inclined relative to the primary bonding surface. The method may further comprise bonding the at least one secondary bonding surface of the flange to a respective peripheral strip of the spar cap.

The method may further comprise selecting an angle of inclination between the primary bonding surface and the at least one secondary bonding surface of the flange such that the at least one secondary bonding surface is substantially parallel to a respective peripheral strip of the spar cap.

In a second aspect of the invention there is provided a wind turbine blade comprising a spar structure, the spar structure comprising a shear web bonded between opposed spar caps, wherein a spar cap comprises a plurality of strips extending longitudinally in a spanwise direction of the blade, the strips being arranged side-by-side in a chordwise direction of the blade, the plurality of strips comprising one or more intermediate strips arranged between respective peripheral strips, and the peripheral strips being inclined relative to the one or more intermediate strips. The shear web comprises a flange extending longitudinally in the spanwise direction, the flange comprising a base defining a primary bonding surface bonded to the spar cap. A chordwise width of the primary bonding surface of the flange corresponds substantially to a chordwise width or a combined chordwise width of the one or more intermediate strips of the spar cap.

The primary bonding surface is preferably substantially parallel to the one or more intermediate strips of the spar cap of the wind turbine blade.

The base of the flange may further define at least one secondary bonding surface extending alongside the primary bonding surface in the spanwise direction, the at least one secondary bonding surface being inclined relative to the primary bonding surface and bonded to a respective peripheral strip of the spar cap. The at least one secondary bonding surface may be substantially parallel to a respective peripheral strip of the spar cap. The base of the flange may comprise at least one longitudinal edge portion that tapers in thickness and defines a respective secondary bonding surface.

The flange may be generally T-shaped in cross-section and comprise an upstand extending from the intermediate portion of the base. The flange may be a pultruded part.

The spar cap may comprise stacks of intermediate and peripheral strips. The strips forming the spar cap may be substantially rectangular in cross section. The strips forming the spar cap may be pultrusions. The strips forming the spar cap may comprise at least three strips or at least three stacks of strips arranged side-by-side. The spar cap may be concave-curved in the chordwise direction.

Optional features described in relation to first aspect of the invention are equally applicable to the second aspect. Repetition of features is avoided purely for reasons of conciseness.

BRIEF DESCRIPTION OF THE DRAWINGS

The present invention will now be described in further detail by way of non-limiting example only with reference to the following figures in which.

DETAILED DESCRIPTION

Figure 1:
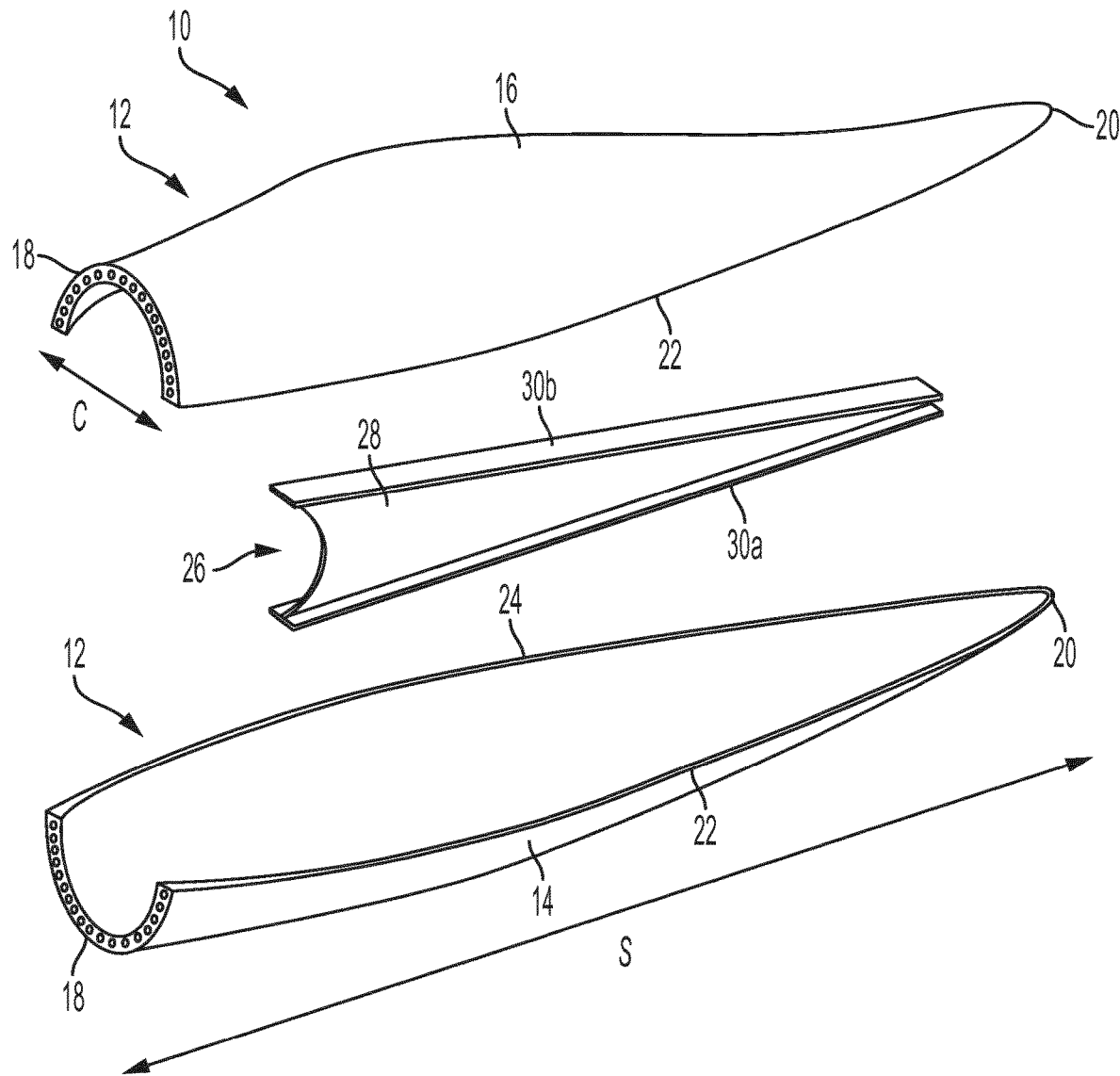
FIG. 1 is an exploded view of a wind turbine blade.

FIG. 1 is an exploded view of a wind turbine blade 10. The blade 10 comprises an outer shell 12 of composite construction and formed in two parts: a windward half shell 14 and a leeward half shell 16. The blade 10 extends in a spanwise direction (S) between a root 18 and a tip 20, and in a chordwise direction (C) between a leading edge 22 and a trailing edge 24. A shear web 26 is located inside the blade 10. The shear web 26 comprises a panel 28 and lower and upper flanges 30a, 30b extending transverse to the panel 28 along longitudinal edges of the panel 28.

Figure 2:
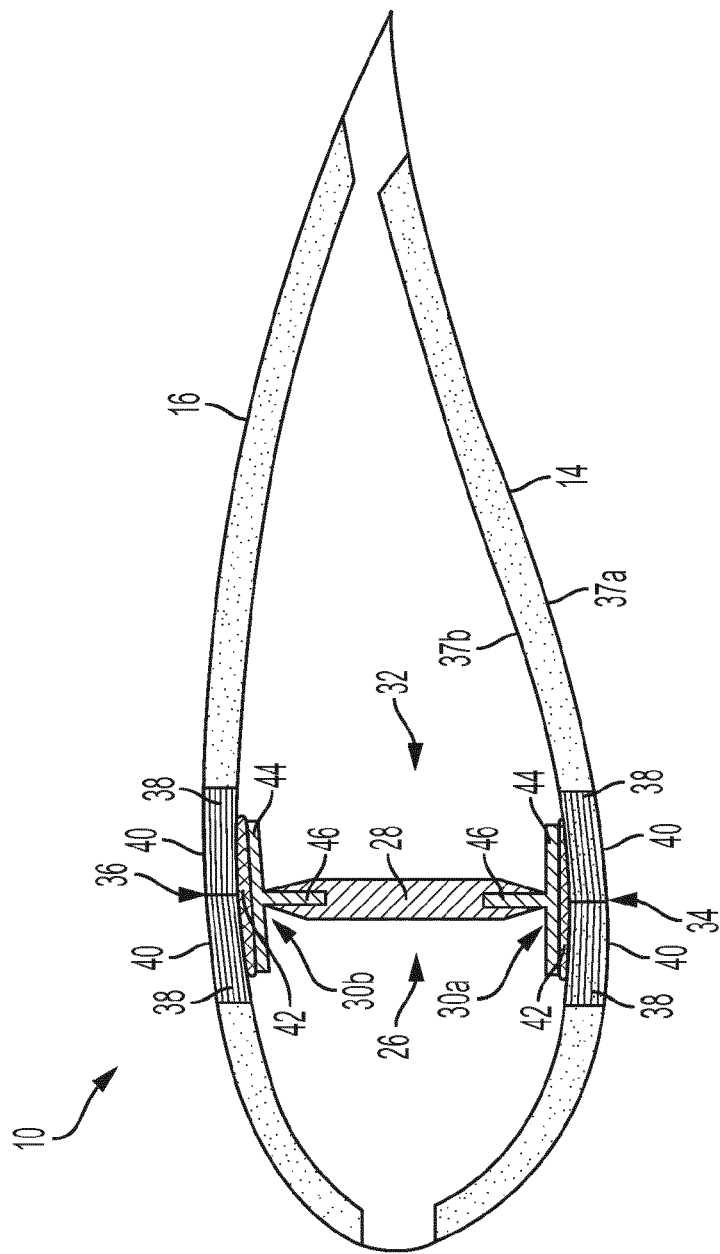
FIG. 2 is a schematic cross-sectional view of a known wind turbine blade.

FIG. 2 shows a cross-sectional view of a known wind turbine blade 10. The blade 10 comprises a spar structure 32, comprising a shear web 26 bonded between first and second spar caps 34, 36. The spar caps 34, 36 are integrated respectively in the windward and leeward half shells 14, 16, between outer and inner skins 37a, 37b of the shells 14, 16. Each spar cap 34, 36 is formed from a plurality of strips 38 of reinforcing material, e.g. CFRP. The strips 38 are formed by pultrusion and are planar structures that are substantially rectangular in cross-section. In this example each spar cap 34, 36 comprises two side-by-side stacks 40 of strips 38.

The lower and upper flanges 30a, 30b of the shear web 26 are bonded respectively to the first and second spar caps 34, 36 by means of adhesive 42. The shear web flanges 30a, 30b are substantially T-shaped in cross-section and comprise a base 44 and an upstand 46 arranged transversely to the base 44. The upstand 46 is integrated with the shear web panel 28, whilst the base 44 is bonded to a respective spar cap 34 or 36.

Figure 3:
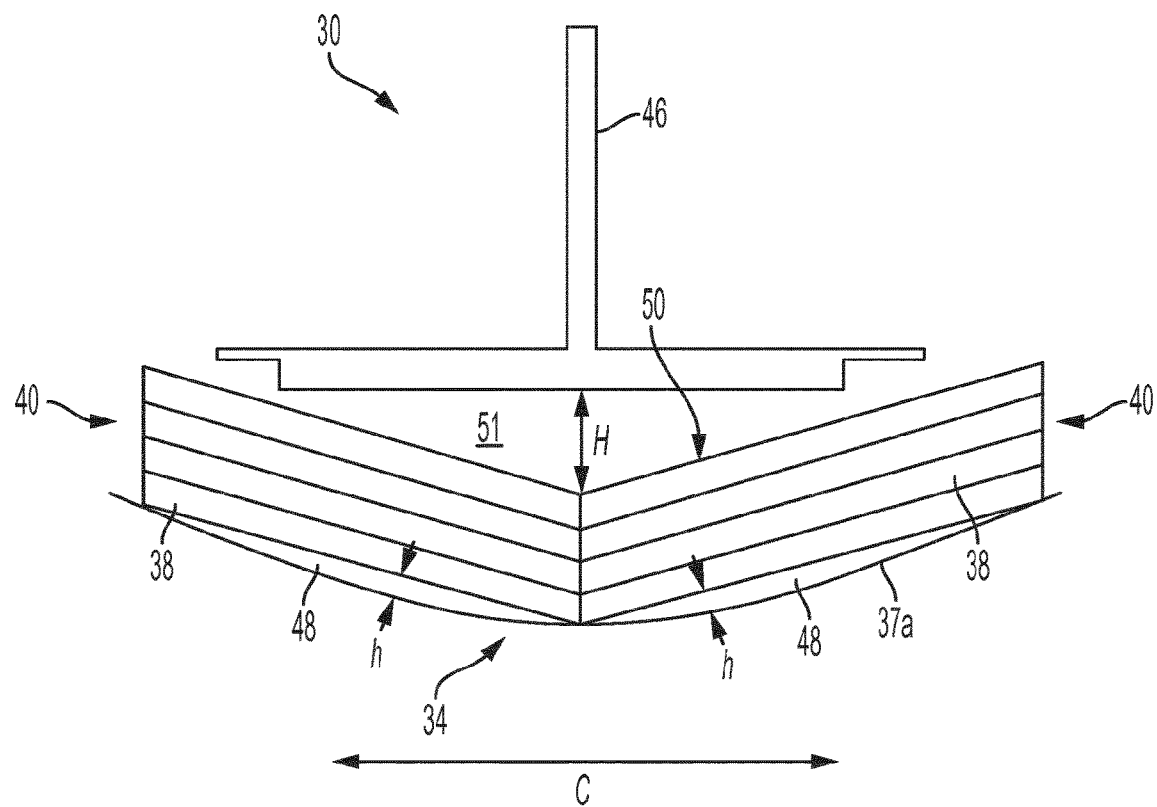
FIG. 3 schematically illustrates the problem of planking in a known spar structure.

FIG. 3 is a schematic view showing a shear web flange 30 bonded to a spar cap 34, and illustrates the problem of 'planking' associated with the known spar structure 32 shown in FIG. 2. For ease of illustration, the adhesive 42 between the shear web flange 30 and the spar cap 34 has been omitted from this figure. As shown in FIG. 3, the planar profiles of the spar cap strips 38 do not conform to the chordwise curvature of the outer skin 37a. Accordingly a small gap 48 is present between the strips 38 and the outer skin 37a. The curvature of the outer skin 37a means that the gap 48 varies in height (h) in the chordwise direction (C) and is greatest beneath the centres of the strips 38. This is known as 'planking'. The gap 48 is filled with resin during manufacture of the blade, however a resin rich area then exists beneath the centres of the strips 38.

The side-by-side stacks 40 of strips 38 in this example are respectively arranged against portions of the outer skin 37a having chordwise curvature in an opposite sense. In this example, the left-hand stack 40 is arranged against a portion of the outer skin 37a having a negative chordwise curvature, whilst the right-hand stack 40 is arranged against a portion of the outer skin 37a having a positive chordwise curvature. Accordingly, the two stacks 40 form a V-shape, and present a V-shaped surface 50 against which the shear web flange 30 is bonded. As shown in FIG. 3, this results in planking between the shear web flange 30 and the spar cap 34, with a relatively large gap 51 existing between the centre of the flange 30 and the spar cap 34. This gap is filled with adhesive 42, but results in a bond line between the shear web flange 30 and the spar cap 34 that varies in thickness (H) in the chordwise direction (C) across the chordwise width of the flange 30. In particular, when planking occurs, excessive adhesive 42 must be used beneath the centre of the flange 30, directly beneath the upstand 46.

Therefore, in the spar structure 32 shown in FIGS. 2 and 3, there exists planking between the spar caps 34, 36 and the outer skin 37a of the shell 12, and planking between the shear web flanges 30a, 30b and the spar caps 34, 36. The amount of planking that occurs in practice can be difficult to predict and hence difficult to take account of in the design of the blade 10. Therefore, when planking occurs it can result in bond lines that may not conform optimally to the intended design specification.

An example of the present invention will now be described with reference to the remaining figures.

Figure 4:
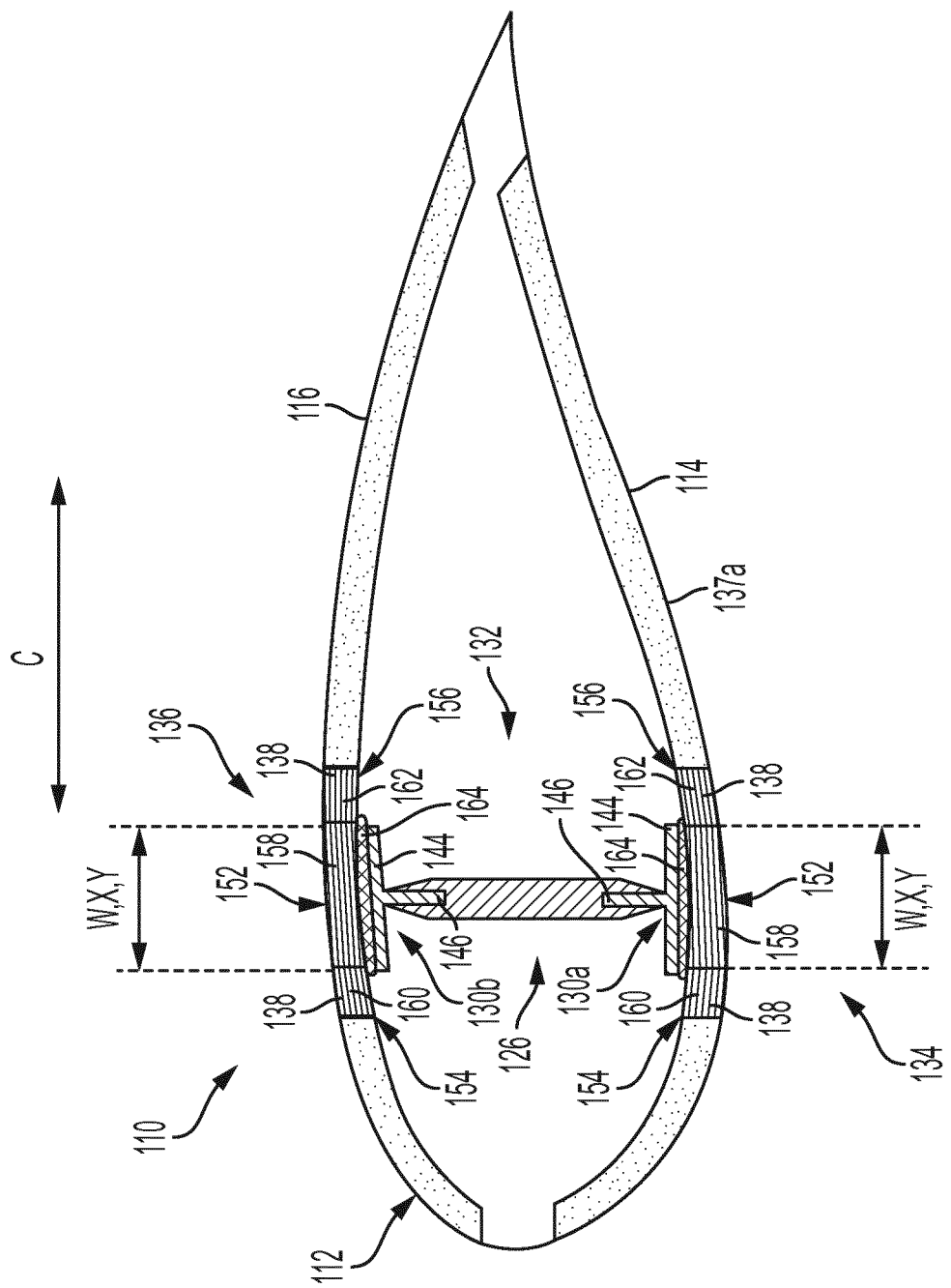
FIG. 4 is a schematic cross-sectional view of a wind turbine blade having a spar structure in accordance with an embodiment of the present invention.

Referring to FIG. 4, this shows a cross-sectional view of a wind turbine blade 110 according to an example of the present invention. The blade 110 comprises a spar structure 132, comprising a shear web 126 bonded between first and second spar caps 134, 136. The spar caps 134, 136 are integrated respectively in the windward and leeward half shells 114, 116. Each spar cap 134, 136 is formed from a plurality of strips 138 of reinforcing material, e.g. CFRP. The strips 138 are formed by pultrusion and are substantially rectangular in cross-section. The strips 138 extend in a spanwise direction (S) generally perpendicular to the plane of the page. In this example the strips 138 are arranged in stacks.

Each spar cap 134, 136 in this example comprises three stacks of strips 138: an intermediate stack 152 arranged between respective peripheral stacks 154, 156. The intermediate stack 152 comprises a plurality of intermediate strips 158, and the peripheral stacks 154, 156 each comprise a plurality of peripheral strips 160, 162. The peripheral strips 160, 162 are inclined slightly relative to the intermediate strips 158 to conform approximately to the chordwise curvature of the outer skin 137a of the shell 112. Accordingly, the spar caps 134, 136 have a concave-curvature in the chordwise direction (C).

In other examples, the strips 138 may be arranged in more than three stacks. In yet further examples, individual strips 138 may be used instead of stacks of strips, depending upon the required thickness of the spar cap 134 or 136 and the thickness of the strips 138. Forming the spar caps 134, 136 from more than two side-by-side strips 138 or stacks of strips 138 advantageously allows the spar caps 134, 136 to conform more closely to the chordwise curvature of the outer skin 137a and reduces planking of the spar caps 134, 136.

The shear web flanges 130a, 130b shown in FIG. 4 are substantially T-shaped in cross-section and extend longitudinally in the spanwise direction (S), generally perpendicular to the plane of the page. Each flange 130a, 130b comprises a base 144 and an upstand 146 arranged transversely to the base 144. The base 144 of each of the flanges 130a, 130b defines a primary bonding surface 164, which is bonded to the intermediate stack 152 of the spar cap 134 or 136. The primary bonding surface 164 is a flat i.e. planar surface.

In accordance with the present invention, the chordwise width (W) of the primary bonding surface 164 is selected to correspond substantially to the chordwise width (X) of the intermediate strips 158 forming the intermediate stack 152 of the respective spar cap 134, 136 against which the flange 130a, 130b is bonded. As shown in FIG. 4, the primary bonding surfaces 164 of the flanges 130a, 130b are arranged substantially parallel to the intermediate strips 158 in this arrangement. Accordingly, the primary bonding surface 164 can be mounted flush against the intermediate strips 158 of the spar cap 134 or 136. Matching the widths of the primary bonding surface 164 and intermediate strips 158 ensures that the primary bonding surface 164 does not extend over the peripheral strips 160, 162 thus avoiding planking of the flanges 130a, 130b against the spar caps 134, 136.

By eliminating planking, it is possible to achieve a well-defined adhesive bondline of substantially uniform thickness between the shear web 126 and the spar caps 134, 136.

In this example, the primary bonding surface 164 of the flange 130a or 130b extends across the full width of the base 144. Accordingly, the width (Y) of the base 144 of the flange 134 or 136 is matched with the width (X) of the intermediate strips 158.

Figure 5:
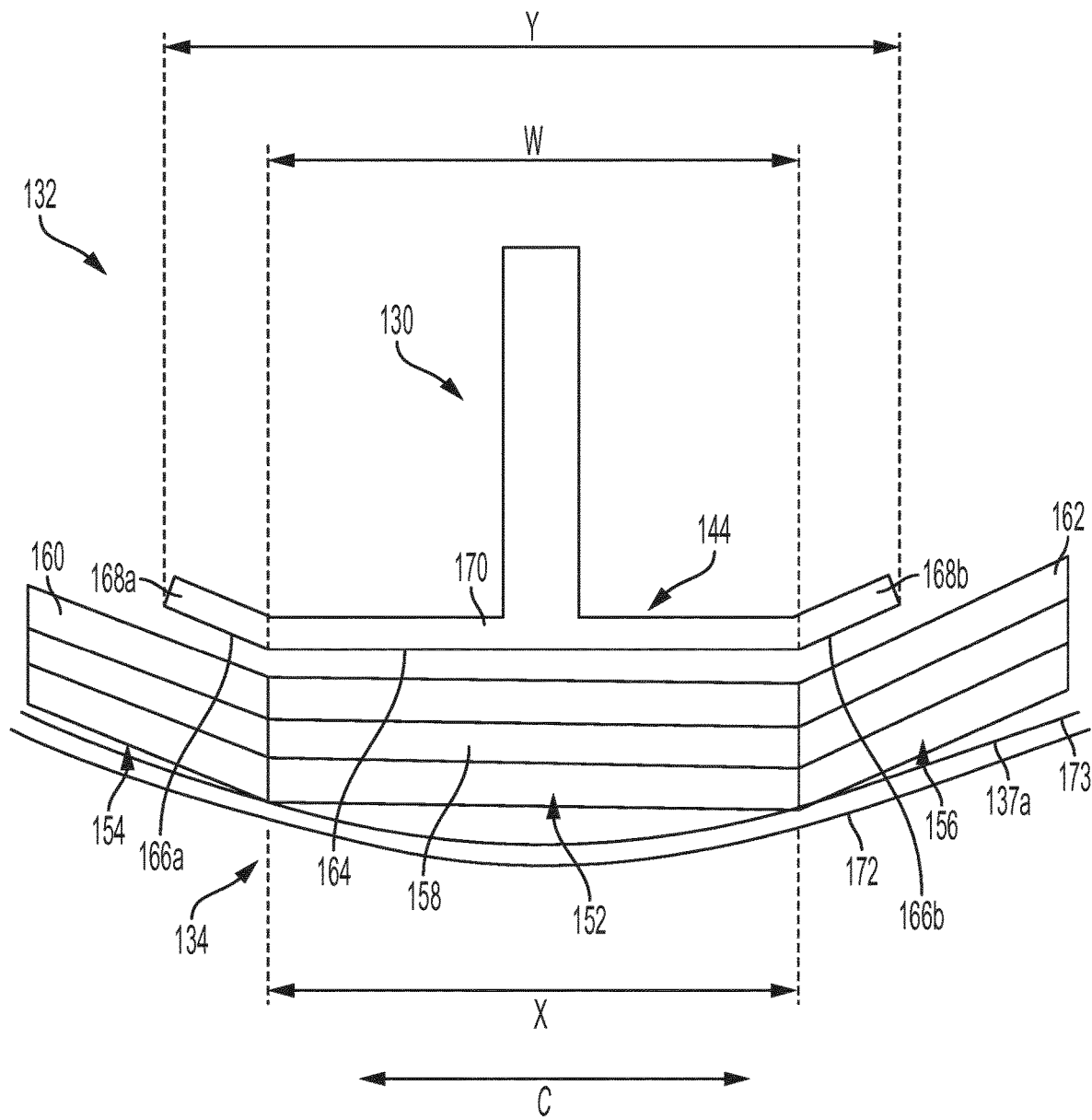
FIG. 5 schematically illustrates part of a spar structure according to another embodiment of the present invention.

Referring now to FIG. 5, this is a schematic view of part of a spar structure 132 according to another embodiment of the present invention. For the avoidance of doubt, the shear web flange 130 shown in FIG. 5 may constitute either a lower or an upper flange equivalent to the lower and upper flanges 130a, 130b shown in FIG. 4. For convenience, FIGS. 5 to 7 will be described with reference to the first spar cap 134 on the windward side of the blade 110, though it will be appreciated that the description is equally valid for the second spar cap 136 on the leeward side of the blade 110. The same reference numerals are used herein for all embodiments to refer to corresponding features.

The spar structure 132 of this embodiment is similar to the previous embodiment, except that the base 144 of the T-shaped flange 130 additionally defines secondary bonding surfaces 166a, 166b in addition to a primary bonding surface 164. The secondary bonding surfaces 166a, 166b extend longitudinally alongside the primary bonding surface 164 in the spanwise direction (S) and are inclined relative to the primary bonding surface 164. In this example, the secondary bonding surfaces 166a, 166b are defined by respective longitudinal edge portions 168a, 168b of the base 144, which are inclined relative to a central portion 170 of the base 144. The central portion 170 of the base 144 defines the primary bonding surface 164. The primary bonding surface 164 is bonded to the intermediate stack 152, whilst the secondary bonding surfaces 166a, 166b are bonded respectively to the peripheral stacks 154, 156. The adhesive is not shown in FIG. 5. In common with the previous embodiment, the width (W) of the primary bonding surface 164 is selected to match the width (X) of the intermediate strips 158 of the spar cap 134.

The angles of inclination between the primary bonding surface 164 and the secondary bonding surfaces 166a, 166b of the flange 130 are selected such that the secondary bonding surfaces 166a, 166b are substantially parallel to the respective peripheral strips 160, 162 of the spar cap 134. The secondary bonding surfaces 166a, 166b can therefore be mounted substantially flush with the peripheral strips 160, 162 of the spar cap 134 whilst the primary bonding surface 164 can be mounted flush with the intermediate strips 158.

As with the previous embodiment, the primary bonding surface 164 does not extend over the peripheral strips 160, 162, hence planking is avoided. The inclined secondary bonding surfaces 166a, 166b enable the flange 130 also to be bonded to the peripheral strips 160, 162 of the spar cap 134, whilst avoiding planking. A bond line of substantially constant thickness may therefore be formed across the chordwise width (Y) of the base 144 of the flange 130.

This embodiment advantageously allows a uniform bond-line to be achieved that is relatively wide in the chordwise direction (C). In other embodiments, the chordwise (C) width of the secondary bonding surfaces 166a, 166b could be sized to match the chordwise (C) width of the peripheral strips 160, 162, thus enabling a bondline to be formed across the full width of the spar cap 134.

FIG. 5 shows the spar structure 132 being fabricated during manufacture of a wind turbine blade 110. In particular, FIG. 5 shows a wind turbine blade mould 172, which is concave curved in the chordwise direction (C), and extends longitudinally in the spanwise direction (S) (generally perpendicular to the page). In order to make the blade 110, one or more layers of reinforcing fabric 173 may be arranged in the mould 172 to form the outer skin 137a of the blade shell 112. The strips 158, 160, 162 of the spar cap 134 may then be arranged, e.g. stacked on top. Further layers of reinforcing fabric (not shown) may be arranged on top to form an inner skin (not shown). Resin may then be applied and cured to integrate the shell parts together as is known in the art. Typically, the resin may be applied during a vacuum-assisted resin-infusion process, in which the components laid up in the mould 172 are covered with a vacuum bag, which is sealed against the mould 172. Air is removed from the vacuum bag to create a negative pressure inside the bag, before resin is admitted into the sealed region under the bag.

Once the resin has cured, adhesive (not shown) may then be applied on top of the spar cap 134 or applied to the bonding surfaces 164, 166a, 166b of the shear web flange 130. The shear web 126 is then pressed against the spar cap 134 to fabricate the spar structure 132. In the context of this fabrication process, the chordwise width (W) of the primary bonding surface 164 of the flange 130 is selected to match the chordwise width (X) of the intermediate strip(s) of the spar cap 134. The shear web 126 is arranged such that the primary bonding surface 164 of the flange 130 is aligned with the intermediate strip(s) 158 of the spar cap 134 and does not extend over the peripheral strips 160, 162, thus avoiding planking.

Figure 6:
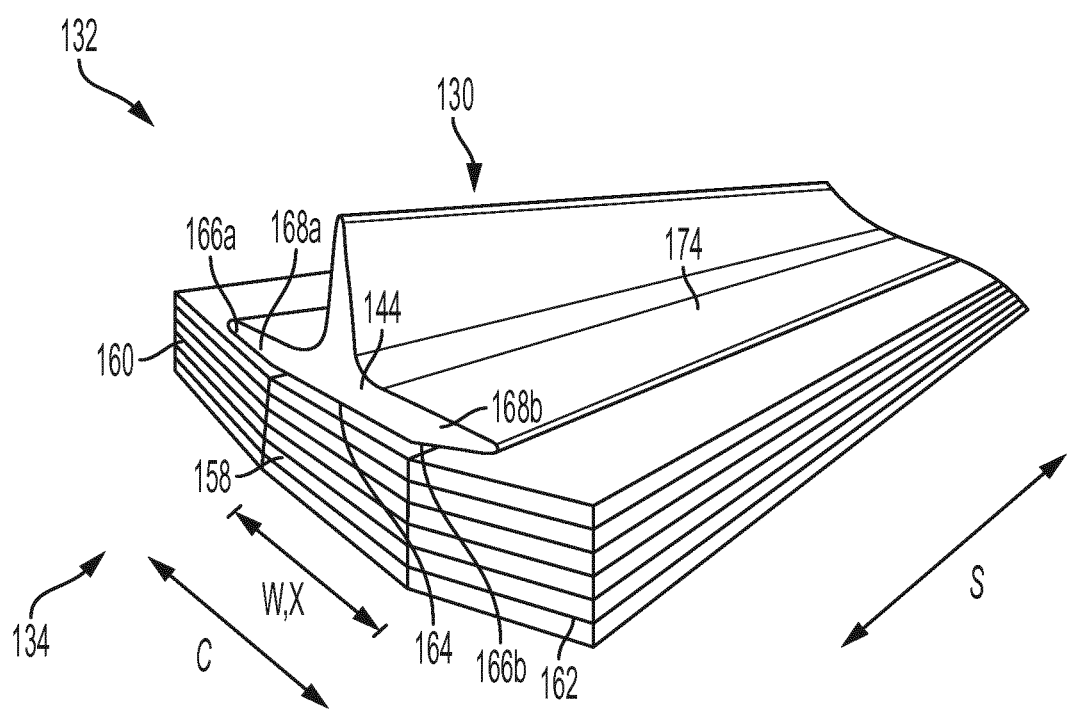
FIG. 6 is a schematic perspective view of a shear web flange bonded to a spar cap in a spar structure according to a further embodiment of the present invention.

Referring now to FIG. 6, this is a perspective view showing part of a spar structure 132 according to a further embodiment of the present invention. In common with the embodiment shown in FIG. 5, the flange 130 includes both primary and secondary bonding surfaces, 164 and 166a, 166b, which are respectively parallel to the intermediate and peripheral strips, 158 and 160, 162 of the spar cap 134. The chordwise width (W) of the primary bonding surface 164 is selected to correspond to the chordwise width (X) of the intermediate strips 158 of the spar cap 134. In contrast to the previous embodiment, the longitudinal edge portions 168a, 168b of the base 144 of the flange 130 taper in thickness to define the secondary bonding surfaces 166a, 166b. An opposite surface 174 of the base 144 is flat i.e. planar across the full width (Y) of the base 144.

Figure 7:
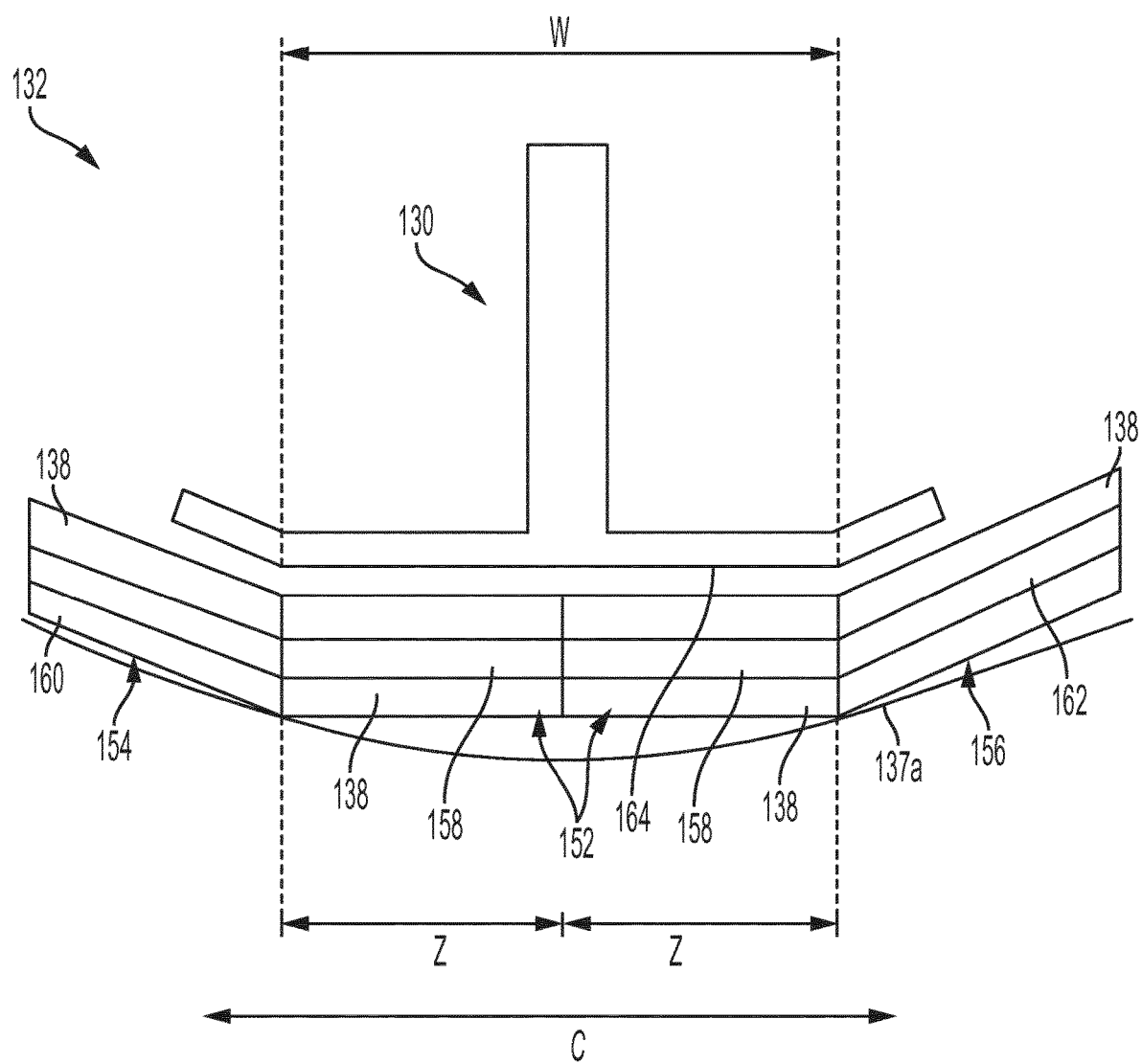
FIG. 7 schematically illustrates part of a spar structure according to a further embodiment of the present invention.

FIG. 7 is a schematic view of part of a spar structure 132 according to a further embodiment of the present invention. This example is similar to the embodiment shown in FIG. 5, but differs in that the spar cap 134 is formed from more than three stacks of strips 138. Specifically, in this example, the spar cap 134 comprises two side-by-side stacks 152 of intermediate strips 158, arranged between respective peripheral stacks 154, 156 of strips 160, 162. In this example, the width (W) of the primary bonding surface 164 of the flange 130 is selected to correspond substantially to the combined chordwise widths (Z) of the intermediate strips 158. In further embodiments, the spar cap 134 may comprise any number of side-by-side intermediate strips 158 or intermediate stacks 152.

In all of the embodiments described above, the flange 130, 130a, 130b may be a pultruded or laminated part.

Matching the width (W) of the primary bonding surfaces 164 of the shear web flanges 130a, 130b to the width (X) of the intermediate strips 158 of the spar caps 134, 136 reduces the planking effect between the shear web flanges 130a, 130b and the respective spar cap 134, 136. Reducing the planking effect makes bond lines more consistent and predictable and provides greater bond thickness certainty. Using more than two side-by-side arranged stacks of strips 138 to form the spar caps 134, 136 also allows the spar caps 134, 136 to more closely conform to the concave-curvature of the outer skin 137a of the shell 112 and so reduces planking of the spar caps 134, 136.

Whilst certain features have been described in relation to a particular embodiment, it will be appreciated that the various features described are interchangeable between embodiments and further variants are envisaged in which such features may be combined in any suitable combination. By way of example, the flange 130a or 130b shown in FIG. 4 or FIG. 6 may equally be used in a spar structure 132 comprising the spar cap 134 shown in FIG. 7.

Many other modifications may be made to the specific examples described herein without departing from the scope of the invention as defined in the following claims.

The invention claimed is:

1. A method of fabricating a wind turbine blade spar structure having a shear web bonded between opposed spar caps, the method comprising:
   providing a wind turbine blade mould extending longitudinally in a spanwise direction and transversely in a chordwise direction;
   laying a spar cap in the mould, the spar cap comprising a plurality of strips extending longitudinally in the spanwise direction, the strips being arranged side-by-side in the chordwise direction, the plurality of strips comprising one or more intermediate strips arranged between respective peripheral strips, and the peripheral strips being inclined relative to the one or more intermediate strips;
   providing a shear web comprising a flange extending longitudinally in the spanwise direction, the flange comprising a base defining a primary bonding surface;
   selecting a chordwise width of the primary bonding surface to correspond to a chordwise width or a combined chordwise width of the one or more intermediate strips of the spar cap; and
   bonding the primary bonding surface of the flange to the one or more intermediate strips of the spar cap, wherein the primary bonding surface is parallel to the one or more intermediate strips of the spar cap in the chordwise direction.

2. The method of claim 1, wherein the base of the flange further defines at least one secondary bonding surface extending alongside the primary bonding surface in the spanwise direction, the at least one secondary bonding surface being inclined relative to the primary bonding surface, and wherein the method further comprises bonding the at least one secondary bonding surface of the flange to a respective peripheral strip of the spar cap.

3. The method of claim 2, wherein the method comprises selecting an angle of inclination between the primary bonding surface and the at least one secondary bonding surface of the flange such that the at least one secondary bonding surface is parallel to a respective peripheral strip of the spar cap in the chordwise direction.

4. A wind turbine blade comprising a spar structure, the spar structure comprising a shear web bonded between opposed spar caps, wherein:
   a spar cap comprises a plurality of strips extending longitudinally in a spanwise direction of the blade, the strips being arranged side-by-side in a chordwise direction of the blade, the plurality of strips comprising one or more intermediate strips arranged between respective peripheral strips, and the peripheral strips being inclined relative to the one or more intermediate strips;
   the shear web comprises a flange extending longitudinally in the spanwise direction, the flange comprising a base defining a primary bonding surface bonded to the spar cap,
   wherein a chordwise width of the primary bonding surface of the flange corresponds to a chordwise width or a combined chordwise width of the one or more intermediate strips of the spar cap, and
   wherein the primary bonding surface is parallel to the one or more intermediate strips of the spar cap in the chordwise direction.

5. The wind turbine blade of claim 4, wherein the base of the flange further defines at least one secondary bonding surface extending alongside the primary bonding surface in the spanwise direction, the at least one secondary bonding surface being inclined relative to the primary bonding surface and bonded to a respective peripheral strip of the spar cap.

6. The wind turbine blade of claim 5, wherein the at least one secondary bonding surface is parallel to a respective peripheral strip of the spar cap in the chordwise direction.

7. The wind turbine blade of claim 5, wherein the base of the flange comprises at least one longitudinal edge portion that tapers in thickness and defines a respective secondary bonding surface.

8. The wind turbine blade of claim 4, wherein the flange is T-shaped in cross-section and comprises an upstand extending from the intermediate portion of the base.

9. The wind turbine blade of claim 4, wherein the flange is a pultruded part.

10. The wind turbine blade of claim 4, wherein the spar cap comprises stacks of intermediate and peripheral strips.

11. The wind turbine blade of claim 4, wherein the strips forming the spar cap comprise at least three strips or at least three stacks of strips arranged side-by-side.

12. The wind turbine blade of claim 4, wherein the spar cap is concave-curved in the chordwise direction.

13. A method of fabricating a wind turbine blade spar structure having a shear web bonded between opposed spar caps, the method comprising:
providing a wind turbine blade mould extending longitudinally in a spanwise direction and transversely in a chordwise direction;
laying a spar cap in the mould, the spar cap comprising a plurality of strips extending longitudinally in the spanwise direction, the strips being arranged side-by-side in the chordwise direction, the plurality of strips comprising one or more intermediate strips arranged between respective peripheral strips, and the peripheral strips being inclined relative to the one or more intermediate strips;
providing a shear web comprising a flange extending longitudinally in the spanwise direction, the flange comprising a base defining a primary bonding surface;
selecting a chordwise width of the primary bonding surface to correspond to a chordwise width or a combined chordwise width of the one or more intermediate strips of the spar cap; and
bonding the primary bonding surface of the flange to the one or more intermediate strips of the spar cap,
wherein the one or more intermediate strips of the spar cap have a planar profile in the chordwise direction.

14. A method of fabricating a wind turbine blade spar structure having a shear web bonded between opposed spar caps, the method comprising:
providing a wind turbine blade mould extending longitudinally in a spanwise direction and transversely in a chordwise direction;
laying a spar cap in the mould, the spar cap comprising a plurality of strips extending longitudinally in the spanwise direction, the strips being arranged side-by-side in the chordwise direction, the plurality of strips comprising one or more intermediate strips arranged between respective peripheral strips, and the peripheral strips being inclined relative to the one or more intermediate strips;
providing a shear web comprising a flange extending longitudinally in the spanwise direction, the flange comprising a base defining a primary bonding surface;
selecting a chordwise width of the primary bonding surface to correspond to a chordwise width or a combined chordwise width of the one or more intermediate strips of the spar cap; and
bonding the primary bonding surface of the flange to the one or more intermediate strips of the spar cap,
wherein the peripheral strips of the spar cap have a planar profile in the chordwise direction.

15. A wind turbine blade comprising a spar structure, the spar structure comprising a shear web bonded between opposed spar caps, wherein:
a spar cap comprises a plurality of strips extending longitudinally in a spanwise direction of the blade, the strips being arranged side-by-side in a chordwise direction of the blade, the plurality of strips comprising one or more intermediate strips arranged between respective peripheral strips, and the peripheral strips being inclined relative to the one or more intermediate strips;
the shear web comprises a flange extending longitudinally in the spanwise direction, the flange comprising a base defining a primary bonding surface bonded to the spar cap,
wherein a chordwise width of the primary bonding surface of the flange corresponds to a chordwise width or a combined chordwise width of the one or more intermediate strips of the spar cap, and
wherein the one or more intermediate strips of the spar cap have a planar profile in the chordwise direction.

16. A wind turbine blade comprising a spar structure, the spar structure comprising a shear web bonded between opposed spar caps, wherein:
a spar cap comprises a plurality of strips extending longitudinally in a spanwise direction of the blade, the strips being arranged side-by-side in a chordwise direction of the blade, the plurality of strips comprising one or more intermediate strips arranged between respective peripheral strips, and the peripheral strips being inclined relative to the one or more intermediate strips;
the shear web comprises a flange extending longitudinally in the spanwise direction, the flange comprising a base defining a primary bonding surface bonded to the spar cap,
wherein a chordwise width of the primary bonding surface of the flange corresponds to a chordwise width or a combined chordwise width of the one or more intermediate strips of the spar cap, and
wherein the peripheral strips of the spar cap have a planar profile in the chordwise direction.

* * * * *